G. E. PRIEST.
BOX MACHINE.
APPLICATION FILED MAY 25, 1910.

987,320.

Patented Mar. 21, 1911.
4 SHEETS—SHEET 1.

G. E. PRIEST.
BOX MACHINE.
APPLICATION FILED MAY 25, 1910.

987,320.

Patented Mar. 21, 1911.
4 SHEETS—SHEET 2.

Witnesses
C. F. Wilson
E. M. Allen

Inventor
G. E. Priest
by attorneys
Southgate & Southgate

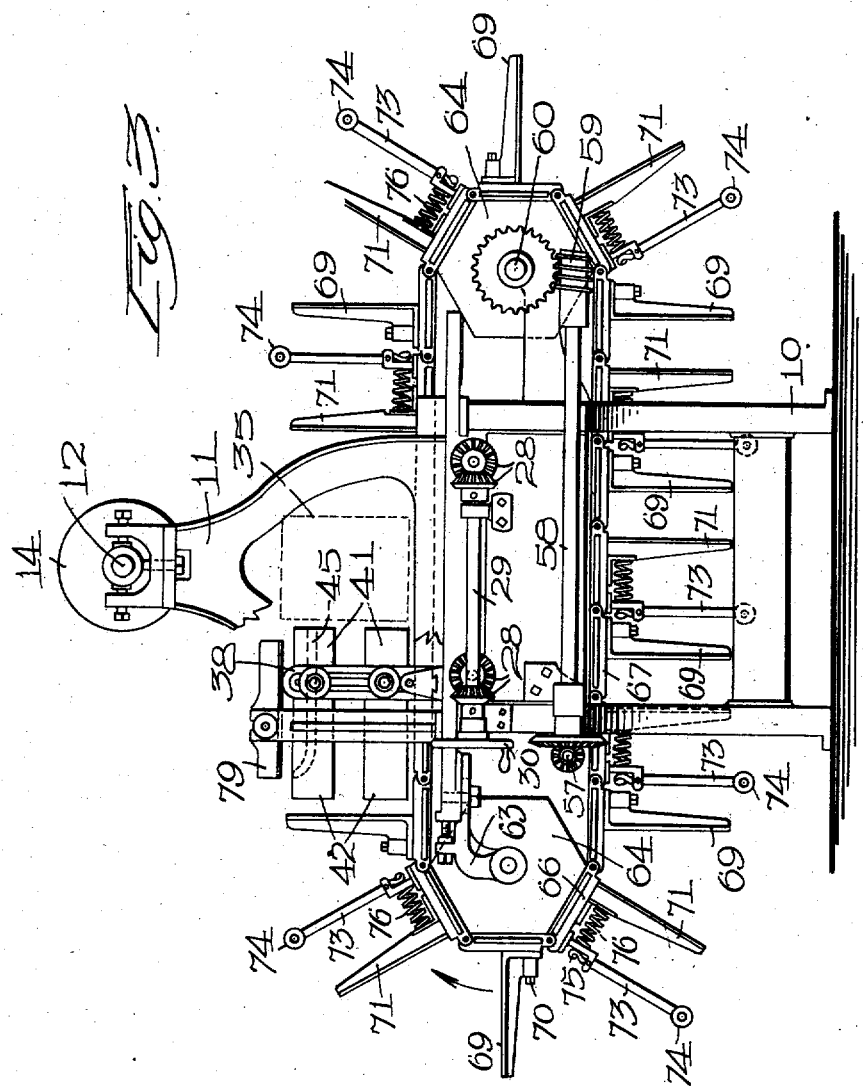

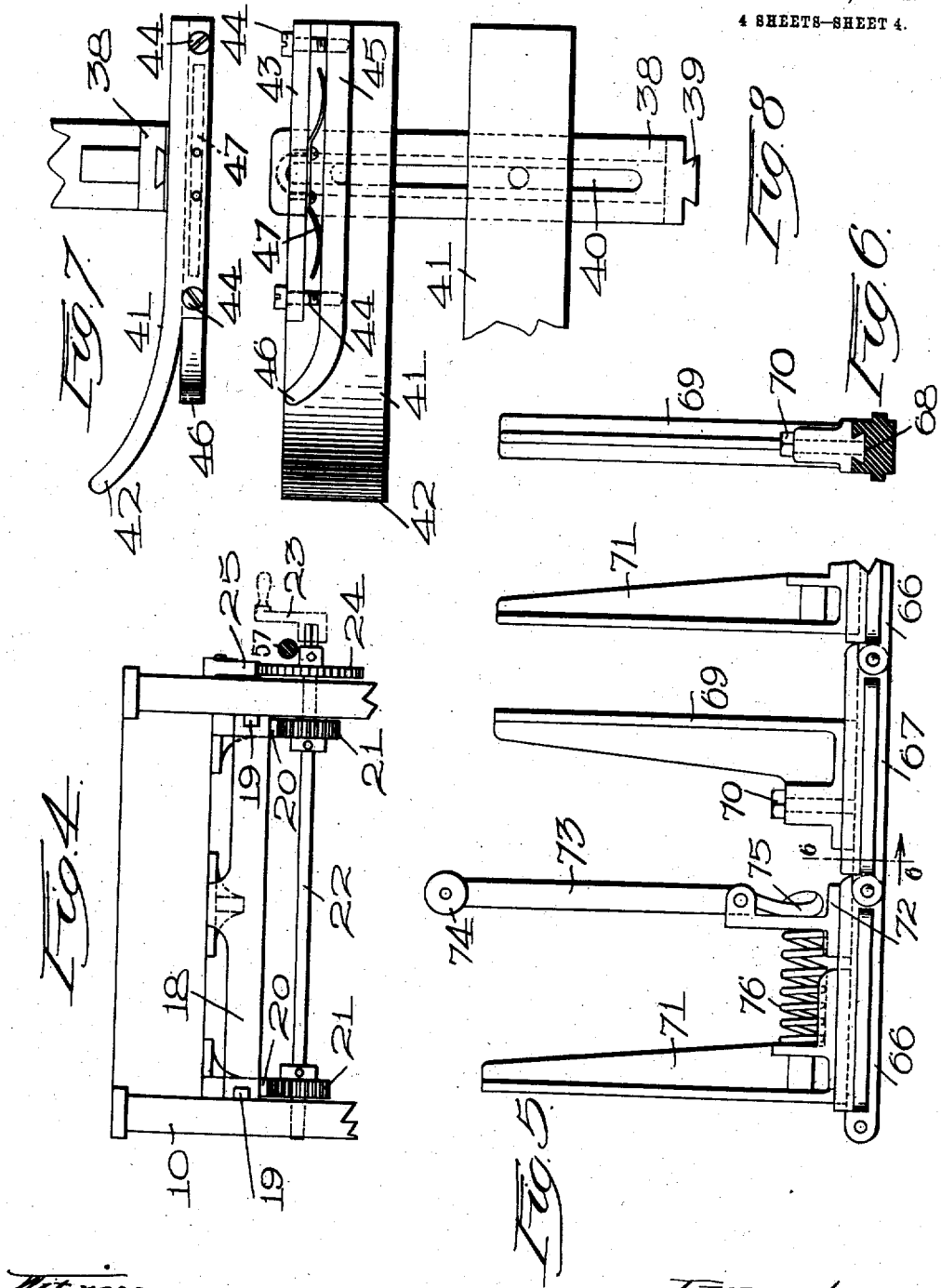

UNITED STATES PATENT OFFICE.

GEORGE E. PRIEST, OF ORANGE, MASSACHUSETTS.

BOX-MACHINE.

987,320.  Specification of Letters Patent.  Patented Mar. 21, 1911.

Application filed May 25, 1910. Serial No. 563,302.

*To all whom it may concern:*

Be it known that I, GEORGE E. PRIEST, a citizen of the United States, residing at Orange, in the county of Franklin and State of Massachusetts, have invented a new and useful Box-Machine, of which the following is a specification.

This invention relates to a machine for use in making boxes of the type known in the trade as a "locker".

The principal objects of this invention are to provide a machine of this type of such a character that instead of having an intermittent feed which requires the stock to be moved up to the saw and then moved back again, it shall have a continuous feed for taking the stock from one position, passing it by the saws and delivering it without changing its general direction of motion; to provide a machine which shall be adapted for operating on both ends of the stock at the same time; also to provide improved means for adjusting the saws and the driving means therefor; to provide simple, practicable, and efficient guides for the stock capable of being adjusted and of exerting a yielding pressure upon the stock; to provide a greatly simplified and improved construction of feed for the stock capable of taking the stock from one end or side of the machine, clamping it in position, delivering it to the guides and saw, and then delivering it from the machine at the other end or side of the machine; to provide means whereby as the feeding device moves to take the work into the guides the clamping pressure will be automatically released so as to permit the stock to be accurately guided and adjusted to position, and whereby the clamp will be automatically applied as soon as the stock moves from the guides to the saw so that the stock will be held firmly in position while being sawed; and also to provide a construction in which the operator will not be obliged to operate the clamp either in placing the stock on the machine or taking it therefrom, this means consisting of a construction whereby the clamps are automatically opened by the travel of the endless chain conveyer for receiving the stock, and are also automatically opened when the endless conveyer moves the stock into position to deliver it from the machine.

Further objects and advantages of the invention will appear hereinafter.

Reference is to be had to the accompanying drawings, in which—

Figure 1:
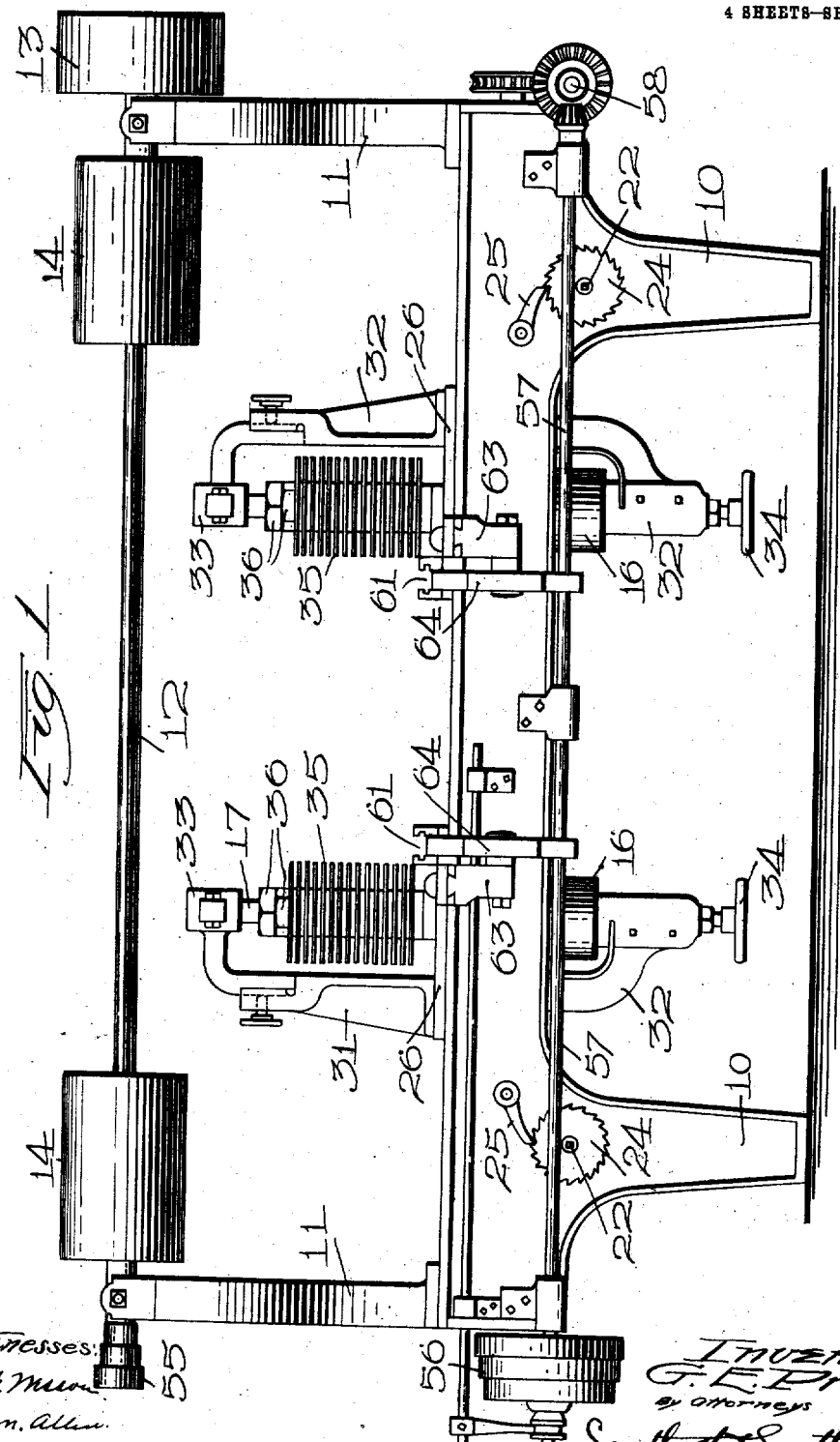
Figure 2:
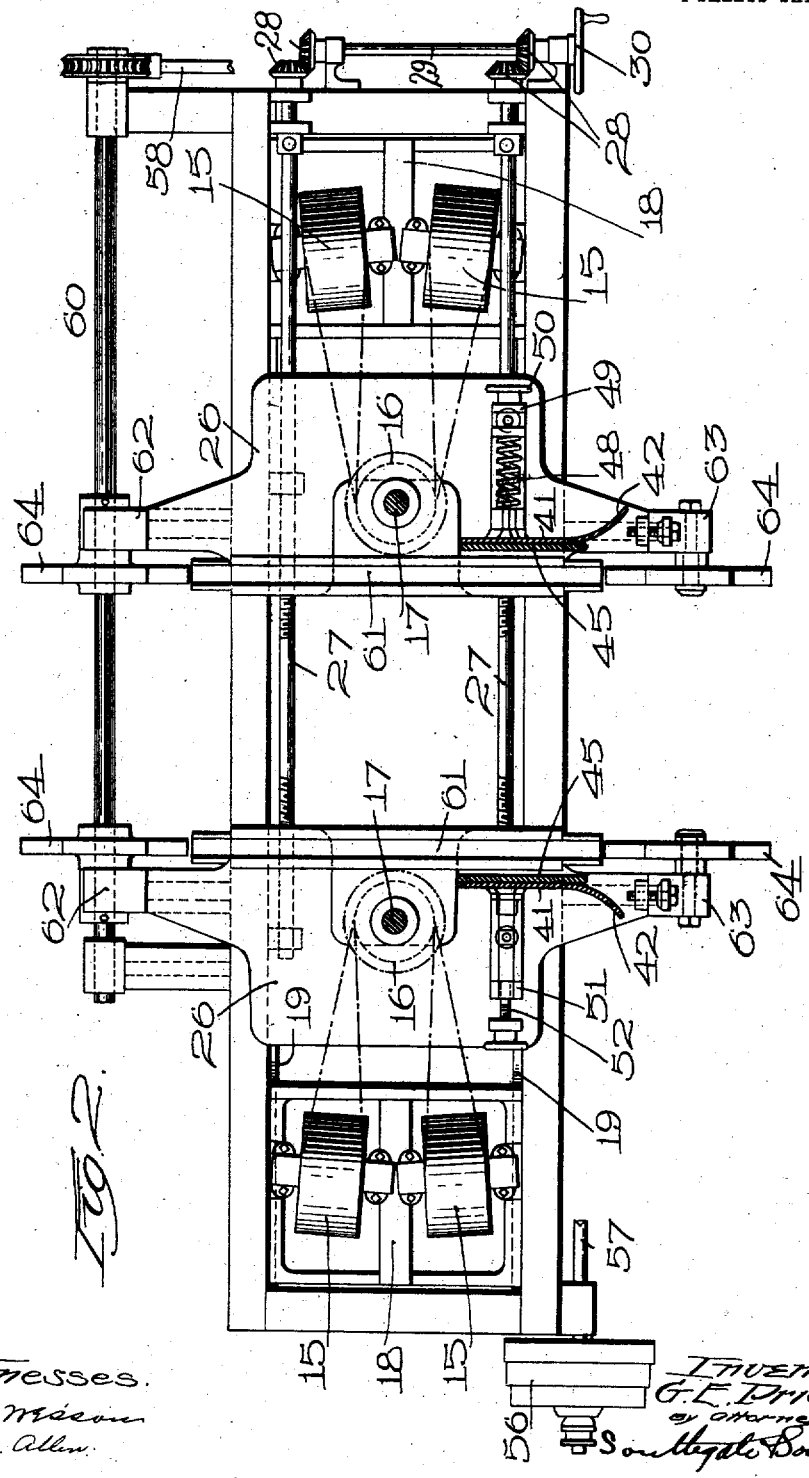

Figure 1 is a side elevation of a machine constructed in accordance with this invention; Fig. 2 is a plan of the same with the upper part removed and portions shown in section; Fig. 3 is an end view; Fig. 4 is an end view of a portion of the device illustrating the idler pulley carriage; Fig. 5 is an end view of a portion of the endless conveyer on an enlarged scale; Fig. 6 is a sectional view of the same on the line 6—6 of Fig. 5. Fig. 7 is a plan of one of the work guides; and Fig. 8 is an elevation thereof.

In the embodiment of the invention illustrated in the drawings the machine is shown as comprising a frame 10 having standards 11 at the ends which support a driving shaft 12 driven by a pulley 13 or in any other desired way. On this shaft are wide faced pulleys 14 which by means of belts passing under idlers 15 drive pulley 16 on vertical saw shafts 17. These saw shafts are adjustable horizontally as will appear hereinafter, and consequently the idlers 15 have to be adjusted. For this purpose each pair of idlers is mounted on a carriage 18 which is movable on longitudinal ways 19 on the frame. Each carriage is provided with a pair of bottom racks 20 operated by pinions 21 on a hand shaft 22. This shaft is provided with a removable crank 23 for operating it and has a ratchet wheel 24 and pawl 25 for holding it in adjusted position. The two ends of the machine are alike in this respect. The saw shafts 17 are also mounted on longitudinally movable carriages or supports 26 which are moved toward and from each other by a pair of right and left-hand screws 27 which are threaded into the supports and are operated by gears or pinions 28 operated by a shaft 29 having a hand wheel 30 thereon. This adjustment of course brings the saws at any desired distance from each other, the carriage 18 being correspondingly shifted. On the supports 26 are mounted brackets 31 and 32 for supporting the shaft 17. Each shaft is removably held in position at the top by a detachable bearing member 33 and the bottom is adjusted by a hand screw 34 by mechanism well known in this art and not illustrated herein in detail. As will be seen there are two of these saw shafts 17 at a distance from each other and on them are mounted saws or cutters 35 rotating in horizontal planes, each saw being separated from the next one by a washer or the like as is well understood in this art. The saws are clamped in position by nuts and lock nuts 36 or the like. The work is guided between these saws in the following manner:—Mounted on each of the supports or carriages 26 in a dove-tailed groove is a vertical standard 38 having a dove-tail bottom projection 39 fitting in the groove. On this standard is a vertical slot 40 through which a plurality of vertical guide plates 41 are secured to it. These guide plates are located transversely with respect to the machine and in a vertical plane. At their forward ends they are provided with outwardly and oppositely flaring edges 42. The upper one is provided with a projection 43 at the top which by means of adjustable screws 44 supports a top guide plate 45 having an upwardly flaring forward end 46. A spring 47 holds this top guide plate yieldingly down on the stock. The flaring ends 42 and 46 are at the forward or receiving side of these guides to gently guide the work into proper position between them. One of these guides is yieldingly pressed toward the other by a spring 48 which presses against the guide and is held at the rear by a standard 49 on the support 26. This spring can be adjusted by a screw 50 as will readily be understood. The other guide is provided with a similar standard 51 and a screw 52 by which it can be positively adjusted in the opposite direction.

On the shaft 12 is a pulley 55 which drives a pulley 56 on a shaft 57 which by gears drives a transverse shaft 58. On the latter is a worm 59 which drives a longitudinal shaft 60 on the back of the machine. The two supports 26 are provided with transverse T-slot grooves or guides 61. Also removably mounted on these supports are brackets 62 and 63 each of which supports a pair of polygonal sprocket wheels 64. These sprocket wheels are located at opposite sides of the machine one pair in front and the other pair in back. They are preferably made polygonal for a purpose which will be described hereinafter. The sprocket wheels on the front of the machine are idlers, but those on the back are movably keyed to the shaft 60 so that in all adjusted positions of the supports 26 these sprocket wheels will be positively driven by this shaft at all times. The sprocket wheels are connected by a pair of endless chain conveyers each consisting of two kinds of links 66 and 67 arranged alternately and pivotally connected end to end. The distance between the pivots is substantially the same as the length of one side of the polygon of the sprocket wheels. Each link is provided with a longitudinal dove-tail groove 68 in which are mounted supports or clamps. These consist of a jaw 69 fixed to the link 67 by bolts 70 or the like and a jaw 71 movably mounted in the dove-tail groove of each link 66. Also fixed to each link 66 is a bracket 72 on which is pivoted a lever 73 extending outwardly and having a roll 74 at the end. This lever is provided with a lower arm 75 which engages a spring 76 to normally force the jaw 71 backwardly toward the jaw 69 on the next link behind. It will be seen that when the endless chain conveyer reaches the position shown in Fig. 3 one of the jaws 69 will be in horizontal position so as to be capable of receiving a bundle of box-blanks. These are laid upon it. At this time the next upper jaw 71 is at an angle to the jaw 69 and is out of the way thereof. This is due to the shape of the sprocket wheel and the way in which the jaws are mounted on the links. As the endless chain conveyer travels upwardly toward the saws the two jaws will gradually be brought closer together until they are parallel with each other when the links are both horizontal. This causes the spring 76 to yieldingly force the jaw 71 into contact with the blanks to hold them in position. But before this time the roll 74 comes into engagement with a fixed cam 79 on the supports 26 and moves the spring and jaw 71 forward so as to release the blanks from all pressure of the spring and allow the guides 41 to act on the blanks to get them into proper and uniform position. As the blanks pass from the guides the roll 74 passes from the cam and then the strong springs 76 act to hold the stock in position between the jaws while it is going through the saws. The stock is held in this way until it reaches the other side of the machine when the preceding jaw 71 gradually recedes from the following jaw 69, releases the blanks, and receives them upon itself. This jaw is then inclined in such position that the blanks slide from it naturally on a table or conveyer placed in position to receive them, or on the floor as desired. It will be seen therefore that when the blanks are placed in position the jaws have automatically opened so as to present no obstacle or difficulty in the way of loading the machine, that the jaws are kept away from each other while the blanks go through the guides to be arranged in proper position with respect to the saws, that they are clamped before they reach the saws and held in clamped position until they pass them, and that finally the blanks are discharged from the machine in an exceedingly simple and efficient manner without any attention on the part of the operator. The operation of the rest of the machine has been indicated with sufficient clearness during the description of the elements.

While I have illustrated and described a preferred form of the invention, I am aware that many modifications can be made therein by any person skilled in the art without departing from the scope of the invention as expressed in the claims. Therefore I do not wish to be limited to all the details of construction herein shown and described, but What I do claim is:—

1. In a box machine, the combination of a frame, a driving shaft supported above the frame, a vertical saw shaft on the frame means for adjusting the vertical shaft horizontally, and means for driving the vertical shaft from the driving shaft comprising a carriage adjustable on the frame, a pair of idler pulleys on the carriage on horizontal axes, and a belt having two strands each engaging one of said idler pulleys.

2. In a box machine, the combination with a frame, of a horizontal driving shaft supported by said frame, a pair of vertical saw shafts located in the same vertical plane as said driving shaft, and horizontally adjustable toward and from each other on the frame, a belt connecting said saw shafts with the driving shaft, and horizontally adjustable means for guiding said belts in all positions thereof.

3. In a machine of the character described, the combination with a saw, of an adjustable member, a plurality of guides mounted thereon and adjustable therealong and arranged in a plane parallel to the plane thereof and at right angles thereto, and a plate carried by one of said guides at right angles thereto, and to said support.

4. In a machine of the character described, the combination of a pair of rotatable wheels, with a series of links forming an endless chain over said wheels, each alternate link having an arm projecting at right angles therefrom, and the other links each being provided with a movable arm projecting at right angles therefrom, means for constantly forcing the movable arm toward the arm of the next link to the rear, and stationary means located adjacent to the chain for automatically withdrawing the movable arm away from the arm of the next link during the travel thereof.

5. In a machine of the character described, the combination of a pair of rotatable wheels, with a series of links forming an endless chain over said wheels, each alternate link having an arm projecting therefrom, and the other links each being provided with a movable arm projecting therefrom, resilient means for forcing the movable arm toward the arm of the next link, a lever projecting beyond the link and connected with the movable arm, and means on the machine for engaging the lever as the chain moves to swing it on its pivot to move the movable arm.

6. In a machine of the character described, the combination of a pair of rotatable wheels, with a series of links forming an endless chain over said wheels, certain links being provided with a movable arm projecting therefrom, a lever projecting beyond the link and connected with the movable arm, and means on the machine for engaging the lever as the chain moves to swing it on its pivot to move the movable arm.

7. In a machine of the character described, the combination with a conveyer chain composed of links, of an arm projecting transversely outwardly from each link, every alternate arm being longitudinally adjustable and adapted to be fixed on its link, and the other arms being made to slide longitudinally on their links, and a lever on each of the latter named links for operating the slidable arm thereon.

8. In a machine of the character described, the combination with a conveyer chain consisting of a plurality of links each having a dovetail slot therein, of arms adjustably mounted in the dovetail slots of certain of the links, means for securing said arms in fixed positions thereon, arms free to slide in the dovetail slots of the remaining links and means for holding the latter arms.

9. In a machine of the character described, the combination of an endless chain formed of links, each having an under-cut longitudinal slot, arms mounted on certain of said links each having a projection fitting said slot therein, a stand fixed on each of said links, on which said arms are slidably mounted, a lever pivotally mounted on each of said stands, and means for connecting each of the levers with the arm on the same link.

10. In a machine of the character described, the combination of an endless chain formed of links, each having an under-cut longitudinal slot, arms mounted on certain of said links, each having a projection fitting said slot therein, a stand fixed on each of said links on which said arms are slidably mounted, a lever pivotally mounted on each of said stands, and a spring for connecting each of the levers with the arm on the same link.

11. In a machine of the character described, the combination of a saw, a conveyer having means for receiving the stock, means for clamping the stock thereon, guides through which the stock is moved on the conveyer to the saw, and means for releasing the stock from the clamping means as it passes through the guides.

12. In a machine of the character described, the combination of a saw, a conveyer having means projecting at the front of the machine in horizontal position for receiving the stock, means for clamping the stock thereon, guides through which the stock is moved on the conveyer to the saw, and means for releasing the stock from the clamping means as it passes into the guides, and for causing the clamping means to act when the stock passes from the guides to the saw.

13. In a machine of the character described, the combination of a saw, a conveyer having means for receiving the stock, means for clamping the stock thereon, and means for releasing the stock from the clamping means as it passes toward the saw, said clamping means being arranged to release the stock automatically after it passes from the saw.

In testimony whereof I have hereunto set my hand, in the presence of two subscribing witnesses.

GEORGE E. PRIEST.

Witnesses:
ADELBERT KILBURN,
WALTER G. CHAPMAN.

Copies of this patent may be obtained for five cents each, by addressing the "Commissioner of Patents, Washington, D. C."